Patented Jan. 22, 1935

1,988,758

UNITED STATES PATENT OFFICE 1,988,758

ORGANIC ARSENIC COMPOUND

Karl Streitwolf, Frankfort-on-the-Main, Alfred Fehrle, Bad-Soden-on-Taunus, and Hubert Oesterlin, Frankfort-on-the-Main-Hochst, Germany, assignors to Winthrop Chemical Company, Inc., New York, N. Y., a corporation of New York No Drawing. Application August 9, 1929, Serial No. 384,804. In Germany September 3, 1928

7 Claims. (Cl. 260—14)

The present invention relates to organic arsenic compounds, more particularly to compounds of the following formula:

HO.CH.CO.NH.Ar.X
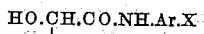
Y wherein X represents the group $-AsO_3H_2$, $-As=O$, wherein Y stands for hydrogen or methyl and Ar represents an aromatic residue which may be substituted.

We have found that by introducing a hydroxy-fatty acid group into an amino-substituted aromatic arsenic or antimony compound, preparations are obtained which possess high therapeutic value and are considerably less toxic than the arsenic or antimony compounds from which they are derived. Like products are also obtained by transforming aromatic amines into their hydroxy-acylamino derivatives, nitrating the latter and reducing the nitro derivatives thus obtained. By the introduction of arsenic or antimony according to one of the known methods, there are obtained from the aminohydroxyacylamino compounds arsonic and stibonic acids respectively, which, if required, can be reduced to arsine oxides and arseno benzenes and to the corresponding antimony compounds respectively and to the stibino-arseno benzenes.

Instead of first introducing the hydroxy-acyl residue, it is also possible to first prepare the arsenic or antimony compounds and then to acylate their amino derivatives.

The same stibonic and arsonic acids respectively can be further obtained, by starting from compounds, for instance of the type

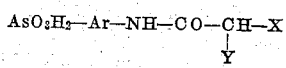

or

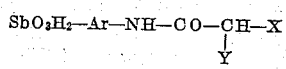

wherein X stands for an amino group, an acid residue or a halogen and wherein Y stands for hydrogen or methyl, and introducing a hydroxyl group into the position of X. There is for instance obtained from a compound of the formula:

$AsO_3H_2$—Ar—NH—CO—$CH_2$—$NH_2$ by a treatment with nitrous acid, the hydroxy-acetylamino derivative of the following formula:

$AsO_3H_2$—Ar—NH—CO—$CH_2$—OH

The same compound can also be obtained from $AsO_3H_2.Ar.NH.CO.CH_2.Cl$, by exchanging chlorine for the hydroxyl group.

The arsonic and stibonic acids obtainable by our invention yield watersoluble salts, when treated with an alkali, ammonia or an organic base, for instance ethanolamine, piperidine, diethylamine or the like.

The following examples serve to illustrate our invention, but they are not intended to limit it thereto.

(1) 23 g. of paranitraniline are heated for about one hour to 160° C.–170° C. with 16.5 g. of crystallized glycolic acid or the corresponding quantity of an aqueous glycolic acid syrup, for instance of 70% strength. The melt is cooled and mixed with water, while stirring, and the paraglycolyl-amino-nitro-benzene which separates is recrystallized from diluted alcohol. It melts at 193° C.–194° C. The yield amounts to 75%.

100 g. of para glycolyaminonitrobenzene are suspended in 200 cc. of alcohol and reduced at 70° C.–80° C. under pressure with hydrogen in the presence of a nickel catalyst. On addition of the corresponding quantity of hydrochloric acid to the reduction mixture, the hydrochloride of para-aminoglycolylaminobenzene precipitates in a pure form. The yield amounts to 95%.

80 g. of this hydrochloride are dissolved in 240 ccm. of water and diazotized with 50 ccm. of concentrated hydrochloric acid and 70 g. of a sodium nitrite solution of 40% strength. The diazo solution is run into a solution of 60 g. of arsenious acid in 160 ccm. of water and 50 ccm. of caustic soda solution of 40° Bé. and the whole is maintained alkaline by addition of 50 g. of sodium carbonate. The whole is filtered and hydrochloric acid is added to the filtrate, whereby the paraglycolylaminobenzene-arsonic acid is precipitated. It is recrystallized from three times its weight of hot water. It is difficultly soluble in alcohol and glacial acetic acid, insoluble in acetone and benzene. The yield amounts to 45%.

The product has the following formula:

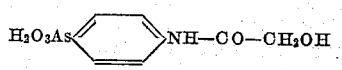

(2) 41 g. of para-aminoglycolylaminobenzene hydrochloride, obtained as indicated in Example 1, are dissolved in 700 ccm. of water and, after addition of 52 ccm. of concentrated hydrochloric acid, diazotized with the calculated quantity of sodium nitrite. The diazo solution is run into a solution of 32 g. of antimony trioxide, dissolved in 400 ccm. of water and 70 ccm. of caustic soda solution of 40° Bé. and 4 g. of natural copper C (a very pure, finely divided form of copper). After the transformation is complete, the whole is neutralized with hydrochloric acid and carbonic acid is introduced until the reaction to turmeric is feebly alkaline. The solution is then purified with decolorizing carbon and the para-glycolylamino-benzene-stibonic acid is precipitated by means of hydrochloric acid. When dry, it is a white powder, which is soluble in diluted alkalies and in ammonia, when heated, it chars without melting.

(3) 135 g. of para-arsanilic acid are triturated with 120 g. of crystallized glycolic acid and heated on the oil bath to 110° C. until a clear melt is obtained, alternatively, the same quantity of para-arsanilic acid may be heated for half an hour to 117° C.–120° C. with 120 g. of an aqueous glycolic acid syrup of 70% strength. The melt is allowed to cool and dissolved by heating with 200 ccm. of water. On cooling, the solution solidifies to a crystalline magma of para-glycolyl-aminobenzene-arsonic acid, which is filtered by suction and recrystallized from water. The yield amounts to 45%.

The product has the following formula:

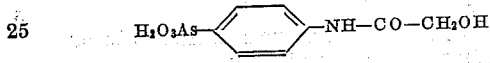

(4) 30 g. of meta-arsanilic acid are heated with 25 g. of glycolic acid on an oil bath to 125° C.–130° C. and the melt is kept at this temperature for 15 minutes and then cooled, whereby the melt crystallizes. The cooled melt is stirred with water, and meta-glycolylaminobenzene-arsonic acid is filtered by suction and recrystallized from 5 times its weight of water. The yield amounts to 70%. It forms soft feebly red needles. It is soluble in hot glacial acetic acid and hot methyl alcohol, sparingly soluble in ethyl alcohol.

(5) 3 g. of meta-aminobenzene-stibonic acid are intimately mixed with 2 g. of anhydrous glycolic acid and heated on an oil bath for 20 minutes to a temperature of 150° C.–155° C. The melt is poured into water, exactly neutralized with caustic soda solution while cooling with ice and reduced by means of sodium hydrosulfite to the stibinobenzene. The stibonic acid can be obtained therefrom, for instance by oxidation with hydrogen peroxide in ammoniacal solution.

The properties of the acid are similar to those of the isomeric glycolylamino-stibonic acid described in Example 2.

(6) 150 g. of 2-amino-4-nitrophenol are heated to 138° C.–140° C. with 180 g. of an aqueous (70%) glycolic acid syrup, whereby a tough magma is formed which is mixed with ice and dissolved by means of caustic soda solution. On acidifying the solution by addition of hydrochloric acid the 2-glycolyl-amino-4-nitrophenol is precipitated; it is recrystallized from acetic acid of 70% strength and melts at 266°C. The yield amounts to 80%.

64 g. of 2-glycolylamino-4-nitrophenol are catalytically reduced at a temperature of 80° C.–90° C. in 200 ccm. of alcohol with hydrogen under pressure. The 2-glycolylamino-4-amino-phenol which is formed crystallizes from the alcoholic solution on cooling.

46 g. of 2-glycolylamino-4-aminophenol are dissolved in 150 ccm. of water and 52 ccm. of concentrated hydrochloric acid and diazotized with the calculated quantity of sodium nitrite. The diazo solution is run while stirring into 38 g. of arsenious acid, dissolved in 100 ccm. of water and 32 ccm. of caustic soda solution of 40° Bé., the solution being kept alkaline with 35 ccm. of caustic soda solution of 40° Bé. When the transformation is complete, the solution is neutralized by means of hydrochloric acid, purified with decolorizing carbon, the 3-glycolylamino-4-hydro-benzene-arsonic acid is precipitated by means of hydrochloric acid and recrystallized from a normal sodium acetate solution.

The yield amounts to 45%. The product forms long needles. It is difficultly soluble in glacial acetic acid, methyl alcohol, ethyl alcohol and water.

(7) 18.2 g. of 2-glycolylamino-4-aminophenol are diazotized with the calculated quantity of sodium nitrite as indicated in Example 6 and caused to react with a mixture of 15 g. of antimony trioxide, 250 ccm. of water, 40 ccm. of glycerine, 30 ccm. of caustic soda solution of 40° Bé. and 2 g. of copper powder. After the evolution of nitrogen has ceased, the solution is neutralized with hydrochloric acid and carbonic acid is added until the reaction to turmeric is feebly alkaline, clarified and treated with hydrochloric acid. The stibonic acid thus precipitated is filtered by suction and washed. In order to purify it, it is dissolved in methyl alcohol or ethyl alcohol, filtered by suction from undissolved matter and precipitated by means of ether. It forms a white powder which is readily soluble in diluted alkalies and ammonia; when heated, it chars without melting.

(8) 19 g. of 2-amino-4-nitrophenol are heated on the water bath for about 12 hours with 76 g. of lactic acid (Acid. lact. Puriss.); the reaction mass is then diluted with water and filtered by suction in order to isolate the lactylamino compound which has become precipitated. 22 g. of the lactylamino-4-nitrophenol so obtained are dissolved in 440 ccm. of water and 8.3 ccm. of caustic soda solution of 40° Bé. and the whole is cooled to 5° C. 84 g. of hydrosulfite are added thereto while stirring. After a short time, a white base precipitates. It is filtered by suction and washed with water.

11.7 g. of the 2-lactylamino-4-aminophenol so obtained are dissolved in 37.5 ccm. of water and 12.5 ccm. of concentrated hydrochloric acid and diazotized with 10.3 g. of sodium nitrite solution of 40° Bé. The diazo solution is added to a solution of 9 g. of arsenious acid in 24 ccm. of water and 7.5 ccm. of caustic soda solution, containing 1.8 g. of natural copper C. By adding drop by drop 9.1 ccm. of caustic soda solution (40° Bé.), the solution is kept alkaline. After the reaction is finished, the whole is filtered by suction and the 3-lactylamino-4-hydroxybenzene-arsonic acid is precipitated by addition of hydrochloric acid to the filtrate.

(9) 125 g. of 3-amino-4-hydroxybenzene-arsonic acid are mixed with 100 g. of glycolic acid and heated on the oil bath to a temperature of 120 C.–125 C. until the mass solidifies after having temporarily become molten. It is dissolved in caustic soda solution, filtered after addition of animal charcoal, and the 3-glycolylamino-4-hydroxybenzene-arsonic acid is precipitated from the filtrate by means of hydrochloric acid, and recrystallized from a normal sodium acetate solution.

(10) In order to prepare 3-chloro-4-glycolyl-amino-aniline, the quantity of chlorine required for the chlorination is introduced at 40° C. into a solution of para-nitroglycolic acid anilide in acetic acid of 50% strength. The reaction mixture is allowed to stand for 12 hours, mixed with twice its weight of water and filtered by suction.

The nitro compound so obtained is recrystallized from diluted alcohol and melts at 148° C. It is catalytically reduced in alcoholic solution to a base 3-chloro-4-glycolylaminoaniline which melts at 150° C. By the addition of the calculated quantity of alcoholic hydrochloric acid to the alcoholic solution of the base, the hydrochloride can be obtained.

40.3 g. of 3-chloro-4-glycolylaminoaniline are diazotized in 200 ccm. of water and 48 ccm. of concentrated hydrochloric acid with 35 g. of a sodium nitrite solution of 40% strength and the diazo solution is caused to react with an antimonite solution prepared from 30 g. of antimony trioxide as described in Example 7. After neutralization with hydrochloric acid and carbonic acid and clarification of the solution, the stibonic acid is precipitated with hydrochloric acid in the form of a white powder, which is readily soluble in diluted alkalies. The ammonium salt of the acid may be obtained by introducing the acid into methyl alcohol, adding ammonia and adding ether to precipitate the ammonium salt. The acid has the characteristic properties of the stibonic acids.

(11) 48 g. of 3-chloro-4-glycolylamino-aniline hydrochloride are dissolved in 120 ccm. of water and 25 ccm. of concentrated hydrochloric acid and diazotized with 35 g. of a sodium nitrite solution of 40% strength. The diazo solution is run, while stirring, into a solution of 30 g. of arsenious acid in 80 ccm. of water and 25 ccm. of caustic soda solution (40° Bé.), the solution being kept alkaline with 25 ccm. of caustic soda solution. After the transformation is finished, the whole is filtered, neutralized with hydrochloric acid, purified with decolorizing carbon and the 3-chloro-4-glycolylamino-benzene-arsonic acid is precipitated by means of hydrochloric acid and recrystallized from 10 times its weight of hot water. The yield amounts to 45%. White prisms are obtained which are difficultly soluble in water and glacial acetic acid, readily soluble in ethyl alcohol and methyl alcohol.

(12) 25 g. of 3-amino-4-chloro-benzene-arsonic acid are heated to 120° C.–125° C. with 20 g. of glycolic acid until the mass, which temporarily becomes molten, has solidified. After cooling it is taken up in 2N-caustic soda solution, purified with animal charcoal and the 4-chloro-3-glycolylaminobenzene-arsonic acid is precipitated by means of hydrochloric acid and recrystallized from water. The yield amounts to 65%. The product crystallizes in the form of needles, which are difficultly soluble in glacial acetic acid and ethyl alcohol, more readily soluble in methyl alcohol, insoluble in acetone.

(13) 25 g. of 2-methyl-5-aminobenzene-arsonic acid are heated to 125° C. with 20 g. of glycolic acid until the melt is clear. After cooling, the mass is stirred with 100 ccm. of water, whereby the 2-methyl-5-glycolylaminobenzene-arsonic acid separates in crystalline form; it is recrystallized from hot water. The yield amounts to 80%. The product forms white fine needles, which are difficultly soluble in water, glacial acetic acid, ethyl alcohol and methyl alcohol.

(14) 25 g. of 2-methoxy-5-aminobenzene-arsonic acid are heated to a temperature of 125° C.–130° C. with 20 g. of glycolic acid, until the mass solidifies with a somewhat violent reaction. After cooling, the mass is taken up in a 2N-caustic soda solution, clarified, and the 2-methoxy-5-glycolyl-aminobenzene-arsonic acid is precipitated from the solution by addition of hydrochloric acid; it is recrystallized from 20 times its weight of boiling water. The yield amounts to 80%. The product forms glittering prisms which are very difficultly soluble in water and glacial acetic acid, scarcely soluble in methyl alcohol and ethyl alcohol and insoluble in acetone.

(15) 5-nitro-2-glycolylamino-anisol (melting at 205° C.–207° C.) obtained by causing 5-nitro-2-amino-anisol to react with glycolic acid under the conditions indicated in Example 1, is reduced to the corresponding amino compound in the manner described in that example.

23.3 g. of 5-amino-2-glycolylamino-anisol hydrochloride are diazotized in a hydrochloric acid solution and the diazo solution is caused to react with a solution of 17 g. of antimony trioxide in 200 ccm. of water, 40 ccm. of glycerine and 32 ccm. of caustic soda solution of 40° Bé., containing 2 g. of copper powder. The 3-methoxy-4-glycolyl-amino-benzene-stibonic acid thus formed is isolated in the manner indicated in Example 2.

(16) 27.5 g. of para-glycolylaminobenzene-arsonic acid are dissolved in 236 ccm. of water and 10 ccm. of caustic soda solution (40° Bé.) and a solution of 124 g. of sodium hydrosulfite in 530 ccm. of water is added thereto, whereby the temperature rises to 30° C.–35° C. The whole is kept for 1½ hours at a temperature of 60° C.–65° C., the para-para'-diglycolylamino-arsenobenzene which precipitates is separated by filtration and washed with water, acetone and ether. The product forms a light yellow powder, which is insoluble in the usual solvents. The yield amounts to 70%.

(17) 13.7 g. of para-glycolylaminobenzene-arsonic acid and 11.7 g. of 3-amino-4-hydroxybenzene-arsonic acid are dissolved in 236 ccm. of water and 10 ccm. of caustic soda solution of 40° Bé. and a solution of 124 g. of sodium hydrosulfite in 530 ccm. of water is added thereto. The solution is heated while stirring to 60° C.–65° C., kept for 1½ hours at this temperature, the precipitated 4-glycolylamino-3'-amino-4'-hydroxyarsenobenzene is filtered by suction and subsequently washed with water, acetone and ether. It forms a yellow powder which is readily soluble in diluted caustic soda solution. The yield amounts to 75%.

(18) 13.75 g. of para-glycolylaminobenzene-arsonic acid and 14.55 g. of 3-glycolylamino-4-hydroxybenzene-arsonic acid are reduced as indicated in Examples 16 and 17. The precipitated 4.3'-diglycolylamino-4'-hydroxyarsenobenzene is a light yellow powder, which is readily soluble in diluted caustic soda solution. The product weighs 19 g. corresponding with a yield of 80%.

(19) 18.7 g. of the ammonium salt of the 3-methoxy-4-glycolylaminobenzene-stibonic acid obtained as indicated in Example 15, are dissolved in 100 ccm. of water and the solution is added to a solution of 11.7 g. of 3-amino-4-hydroxybenzene-arsonic acid in 100 ccm. of water and 12 ccm. of caustic soda solution (40° Bé.). The combined solutions are added to 155 g. of hydrosulfite, dissolved in 600 ccm. of water, and the whole is heated for half an hour to 60° C. The arseno-stibinobenzene, which separates as a yellow precipitate, is filtered by suction, washed with water and dried in a vacuum. The 3-amino-4-hydroxy-3'-methoxy-4'-glycolylamino-arseno-stibinobenzene is a yellow powder which is soluble in caustic soda solution to a clear solution.

(20) To 40 g. of sodium hydrosulfite, dissolved in 150 ccm. of water, is added, while stirring, a solution of 9 g. of the ammonium salt of glycolyl-amino-3-methoxy-benzenestibonic acid in 50 ccm.

of water. The separation of the yellow stibinobenzene which occurs after a short time, is accomplished by heating for half an hour to 50° C. to 60° C. The precipitate is then separated by filtering by suction and the yellow 3,3'-dimethoxy - 4,4' - diglycolylamino - stibinobenzene is dried in a vacuum.

(21) 26 g. of 4-hydroxy-3-glycolylaminobenzene-arsonic acid are dissolved in 150 ccm. of normal caustic soda solution and 900 ccm. of water, 100 ccm. of a potassium iodide solution of 10% strength are added thereto and the whole is acidified with 1.1 liters of 10/n hydrochloric acid. By suitably cooling, the temperature is kept at 20° C.–25° C. The hydrochloric acid solution is saturated with sulfurous acid, the precipitated 4-hydroxy-3-glycolylaminophenylarsine oxide is filtered by suction, washed with water, mixed while stirring with 100 ccm. of normal sodium carbonate solution, filtered by suction, washed and dried. It melts at 230° C.–232° C. It is soluble in glacial acetic acid, methyl alcohol, insoluble in water, acetone and benzene.

(22) 25 g. of 2-chloro-4-aminobenzenearsonic acid are heated to 100° C. with 20 g. of glycolic acid until a clear melt is obtained. On cooling a tough mass is obtained, which is dissolved in 50 ccm. of water, mixed with animal charcoal, filtered and the filtrate is allowed to stand for 24 hours at 0° C. The precipitated 2-chloro-4-glycolylamino-benzenearsonic acid is recrystallized from water.

(23) 110 g. of arsanilic acid are dissolved in 1 liter of normal caustic soda solution. 1 liter of water is added to this solution and 70 g. of chloracetyl chloride and 670 ccm. of normal caustic soda solution are alternatingly run in while cooling. When the reaction is complete, the whole is filtered through animal charcoal and acidified until there is an acid reaction to Congo paper. The chloracetylarsanilic acid is then precipitated in a pure form. 29 g. of chloracetylarsanilic acid are dissolved in 200 ccm. of normal caustic soda solution and the solution is boiled in a reflux apparatus until the solution shows an acid reaction to litmus paper, which occurs after about one hour. Then the solution is acidified so as to show an acid reaction to Congo paper and purified with animal charcoal; the glycolylaminobenzenearsonic acid crystallizes from the filtrates.

(24) 25 g. of chloracetylarsanilic acid, obtained as indicated in Example 23 are stirred with a small quantity of water and dissolved with concentrated ammonia; a further 150 ccm. of concentrated ammonia are added and the whole is allowed to stand for 12 hours at a gentle heat in a closed flask. Then the solution is concentrated, acidified with hydrochloric acid, filtered through animal charcoal and made neutral to Congo paper with sodium acetate. The glycylarsanilic acid crystallizes.

13.7 g. glycylarsanilic acid are dissolved in 40 ccm. of water and 12.5 ccm. of concentrated hydrochloric acid and 25 ccm. of 2N-sodium nitrite solution are then gradually introduced drop by drop while cooling and stirring. The solution is neutralized with caustic soda solution, filtered through animal charcoal and made acid to Congo. After some time the glycolylaminobenzenearsonic acid crystallizes.

(25) 92 g. of para-aminophenylarsine oxide are acylated with chloracetyl chloride, as described in Example 23. On acidifying the alkaline solution, the para-chloracetylaminophenylarsine oxide precipitates in the form of a white powder. 26.6 g. of chloracetylaminophenylarsine oxide are heated for 2 hours on the steam bath with 200 ccm. of normal caustic soda solution; the whole is neutralized with hydrochloric acid and the para-glycolylamino-phenylarsine oxide thus precipitated is filtered by suction.

(26) 115 g. of 3-methyl-4-aminobenzenearsonic acid are caused to react with chloracetylchloride, as described in Example 23. 10 g. of 3-methyl-4-chloracetylamino-benzenearsonic acid are dissolved in some water and concentrated ammonia, 80 ccm. of concentrated ammonia are added and the whole is allowed to stand for 12 hours at room temperature. The solution is concentrated, supersaturated with hydrochloric acid, purified with animal charcoal and neutralized with sodium acetate, whereby the 3-methyl-4-glycylamino-benzenearsonic acid is precipitated. 14.4 g. of 3-methyl-4-glycylamino-benzene-arsonic acid are dissolved in 60 ccm. of water with 12.5 ccm. of concentrated hydrochloric acid and 25 ccm. of 2N-sodium nitrite solution are introduced drop by drop while cooling. After a short heating to 30° C.–40° C. the solution is filtered through animal charcoal and cooled. The 3-methyl-4-glycolylamino-benzenearsonic acid crystallizes.

(27) 46 g. of 2-hydroxy-4-chloracetylamino-benzenearsonic acid (prepared from 2-hydroxy-4-aminobenzenearsonic acid and chloracetylchloride in a manner analogous to that described in Example 23 and melting at 223° C.–224° C.) are boiled in a reflux apparatus for 1 hour in 150 ccm. of 2N-caustic soda solution and cooled, and the 2-hydroxy-4-glycolylaminobenzenearsonic acid crystallizes. By acidifying with dilute hydrochloric acid, the precipitation is completed. The yield amounts to 80%. The product forms crystals which are feebly red colored and is soluble when heated in water, glacial acetic acid, methyl alcohol and ethyl alcohol.

(28) 30 g. of 2-methyl-4-chloracetylaminobenzenearsonic acid (prepared from 2-methyl-4-aminobenzenearsonic acid and chloracetyl chloride in a manner analogous to that described in Example 23 and melting at 192° C.–193° C.) are dissolved in 200 ccm. of normal caustic soda solution and boiled under reflux for 1 hour. From the cooled solution crystallizes the sodium salt of 2 - methyl-4-glycolylamino-benzenearsonic acid, which is decomposed by means of dilute hydrochloric acid. The precipitated 2-methyl-4-glycolylaminobenzenearsonic acid is recrystallized from 4 parts of hot water. The yield amounts to 80%. White glittering laminae containing one mol of crystal water, are obtained which are soluble when heated in methyl alcohol, ethyl alcohol and glacial acetic acid, and melt at 195° C.–197° C.

(29) 32 g. of 2.5-dimethyl-4-chloracetylaminobenzenearsonic acid (obtained from 2.5-dimethyl-4-aminobenzenearsonic acid and chloracetyl chloride in a manner analogous to that described in Example 23) are dissolved in 75 ccm. of normal caustic soda solution, 100 ccm. of 2N-caustic soda solution are added thereto and the whole is boiled for 1 hour in a reflux apparatus. The 2.5-dimethyl-4-glycolylaminobenzenearsonic acid is precipitated from the cooled solution by means of hydrochloric acid. The yield amounts to 85%. White small needles are obtained, which are soluble when heated in water, glacial acetic acid and alcohol.

(30) 92 g. of 2-methyl-4-aminobenzenearsonic acid are dissolved in 400 ccm. of 2N-caustic soda solution. 105 g. of α-bromoproprionylbromide and 500 ccm. of normal caustic soda solution are alternatingly introduced into the solution at room temperature drop by drop while stirring. When, after having stirred for 2 hours, the reaction is complete, the mass is filtered through animal charcoal and by addition of hydrochloric acid, the 2-methyl-4-bromoproprionylaminobenzene arsonic acid is precipitated. The yield amounts to 92%. The melting point is 197° C.–198° C.

36.6 g. of 2-methyl-4-bromoproprionylamino-benzenearsonic acid are dissolved in 100 ccm. of 2N-caustic soda solution and the solution is boiled for 1 hour in a reflux apparatus, the solution is then cooled and the 2-methyl-4-lactylaminobenzenearsonic acid is precipitated by means of hydrochloric acid. White crystals are obtained, which are soluble when heated in methyl alcohol, ethyl alcohol, glacial acetic acid and insoluble in acetone.

We claim:

1. The compounds of the following formula:

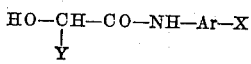

wherein X represents —AsO₃H₂ or —As=O, Y stands for hydrogen or lower alkyl and Ar represents a benzene radicle one hydrogen atom of which may be substituted by hydroxy, lower alkyl, lower alkoxy or halogen, said products being non-toxic.

2. The compounds of the following formula:

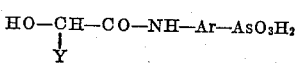

wherein Y stands for hydrogen or methyl and Ar represents a benzene radicle one hydrogen atom of which may be substituted by hydroxy, lower alkyl, lower alkoxy, or halogen said products being non-toxic.

3. The compounds of the following formula:

wherein Ar represents a benzene radicle one hydrogen atom of which may be substituted by hydroxy, lower alkyl, lower alkoxy or halogen, said products being non-toxic.

4. The compounds of the following formula:

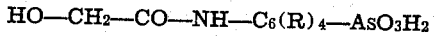

wherein one R stands for CH₃, OCH₃, Cl or CH, the remaining R's for hydrogen, said products being non-toxic.

5. The compounds of the following formula:

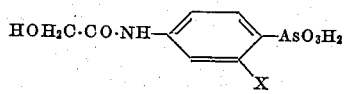

wherein X represents H, alkyl, OH or halogen, said products being non-toxic.

6. The compound of the following formula:

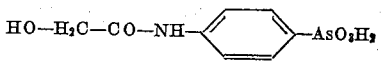

being difficultly soluble in alcohol and glacial acetic acid, insoluble in acetone and benzene, and being non-toxic.

7. The compound of the following formula:

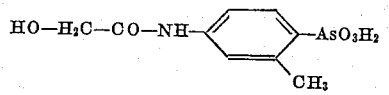

forming white glittering laminate, soluble when heated in methyl alcohol, ethyl alcohol and glacial acetic acid, melting at 195° C.–197° C., and being non-toxic.

KARL STREITWOLF.
ALFRED FEHRLE.
HUBERT OESTERLIN.